(12) United States Patent
Nelson

(10) Patent No.: US 6,303,245 B1
(45) Date of Patent: Oct. 16, 2001

(54) FUEL CELL CHANNELED DISTRIBUTION OF HYDRATION WATER

(75) Inventor: Milton H. Nelson, Saratoga Springs, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/385,497

(22) Filed: Aug. 27, 1999

(51) Int. Cl.$^7$ ................................................ H01M 2/00
(52) U.S. Cl. .......................... 429/34; 429/35; 429/38; 429/39
(58) Field of Search ............................ 429/34, 35, 38, 429/39

(56) References Cited

U.S. PATENT DOCUMENTS

| | | | |
|---|---|---|---|
| 4,169,917 | 10/1979 | Baker et al. | 429/26 |
| 4,678,724 | 7/1987 | McElroy . | |
| 4,774,154 | 9/1988 | Singelyn et al. | 429/36 |
| 4,795,536 | 1/1989 | Young et al. | 204/129 |
| 4,797,185 | 1/1989 | Polak et al. | 204/129 |
| 4,824,741 | 4/1989 | Kunz | 429/26 |
| 4,973,530 | 11/1990 | Vanderborgh | 429/13 |
| 4,988,583 | 1/1991 | Watkins et al. | 429/30 |
| 5,110,691 | 5/1992 | Krasij et al. | 429/35 |
| 5,262,249 | 11/1993 | Beal et al. | 249/26 |
| 5,262,250 | 11/1993 | Watanabe | 429/33 |
| 5,264,299 | 11/1993 | Krasij et al. | 429/30 |
| 5,284,718 | 2/1994 | Chow et al. | 429/26 |
| 5,300,370 | 4/1994 | Washington et al. | 429/13 |
| 5,322,744 | 6/1994 | Koseki | 429/13 |
| 5,382,478 | 1/1995 | Chow et al. | 429/26 |
| 5,432,020 | 7/1995 | Fleck | 429/13 |
| 5,432,021 | 7/1995 | Wilkinson et al. | 429/17 |
| 5,441,819 | 8/1995 | Voss et al. | 429/13 |
| 5,482,680 | 1/1996 | Wilkinson et al. | 422/177 |
| 5,503,945 | 4/1996 | Petri et al. . | |
| 5,514,487 | * 5/1996 | Washington et al. | 429/39 |
| 5,523,175 | 6/1996 | Beal et al. | 429/30 |
| 5,529,855 | 6/1996 | Watanabe | 429/34 |
| 5,547,776 | 8/1996 | Fletcher et al. | 429/13 |
| 5,686,199 | * 11/1997 | Cavalca et al. | 429/30 |
| 5,733,682 | 3/1998 | Quadakkers et al. | 429/210 |
| 5,773,682 | 6/1998 | Wilkinson et al. | 429/13 |
| 5,840,414 | 11/1998 | Bett et al. | 428/307.7 |
| 5,840,438 | 11/1998 | Johnson et al. . | |
| 5,853,909 | 12/1998 | Reiser | 429/13 |
| 5,858,567 | 1/1999 | Spear, Jr. et al. | 429/12 |
| 5,863,671 | 1/1999 | Spear, Jr. et al. | 429/12 |
| 5,906,898 | 5/1999 | Pondo . | |
| 6,007,931 | 12/1999 | Fuller et al. | 429/13 |
| 6,013,385 | 1/2000 | DuBose | 429/17 |
| 6,071,635 | * 6/2000 | Carlstrom, Jr. | 429/34 |

FOREIGN PATENT DOCUMENTS 0041294    12/1981   (EP) .

* cited by examiner

Primary Examiner—Gabrielle Brouillette
Assistant Examiner—Dah-Wei D. Yuan
(74) Attorney, Agent, or Firm—Fish & Richardson P.C.

(57) ABSTRACT

A fluid flow plate for a fuel cell is provided with hydration channels along the reactant channel lands of the plate. Water is injected into a gas diffusion layer facing the hydration channels in order to promote hydration of the fuel cell membrane.

33 Claims, 6 Drawing Sheets

FUEL CELL CHANNELED DISTRIBUTION OF HYDRATION WATER

This invention relates generally to fuel cells and more specifically to humidifying the ion exchange membrane in such cells.

BACKGROUND OF THE INVENTION

A fuel cell is a device which converts chemical energy of a fuel into electrical energy, typically by oxidizing the fuel. In general a fuel cell includes an anode and a cathode fluid flow plate separated by an electrolyte. When fuel is supplied to the anode and oxidant is supplied to the cathode, the electrolyte electrochemically generates a useable electric current which is passed through an external load. The fuel typically supplied is hydrogen and the oxidant typically supplied is oxygen. In such cells, the electrolyte combines the oxygen and hydrogen to form water and to release electrons. The chemical reaction of a fuel cell using hydrogen as the fuel and oxygen as the oxidant is shown in equation (1).

$$H_2 + \tfrac{1}{2}O_2 \rightarrow H_2O \tag{1}$$

This process occurs through two redox or separate half-reactions which occur at the electrodes:

Anode Reaction $$H_2 \rightarrow 2H^+ + 2e^- \tag{2}$$

Cathode Reaction $$\tfrac{1}{2}O_2 + 2H^+ + 2e^- \rightarrow H_2O \tag{3}$$

In the anode half-reaction, hydrogen is consumed at the fuel cell anode releasing protons and electrons as shown in equation (2). The protons are injected into the fuel cell electrolyte and migrate to the cathode. The electrons travel from the fuel cell anode to cathode through an external electrical load. In the cathode half-reaction, oxygen, electrons from the load, and protons from the electrolyte combine to form water as shown in equation (3). The directional flow of protons, such as from anode to cathode, serves as a basis for labeling an "anode" side and a "cathode" side of the fuel cell.

The anode and cathode fluid flow plates are made of an electrically conductive material, typically metal or compressed carbon, in various sizes and shapes. Fluid flow plates act as current collectors, provide paths for access of the fuels and oxidants to the cell, and provide a path for removal of waste products formed during operation of the cell. Each fuel cell includes a catalyst, such as platinum, for promoting the chemical reaction(s) that take place on the electrodes in the fuel cells. Additionally, the fluid flow plates include a fluid flow field of channels for directing fluids within the cell.

Fluid flow plates are commonly produced by any of a variety of processes. For example, one technique for plate construction, referred to as "monolithic" style, includes compressing carbon powder into a coherent mass which is subjected to high temperature processes to bind the carbon particles together, and to convert a portion of the mass into graphite for improved electrical conductivity. The mass is then cut into slices, which are formed into the fluid flow plates. Typically, each fluid flow plate is subjected to a sealing process (e.g., resin impregnation) in order to decrease gas permeation therethrough and reduce the risk of uncontrolled reactions.

Fuel cells are classified into several types according to the electrolyte used to accommodate ion transfer during operation. Examples of electrolytes include aqueous potassium hydroxide, concentrated phosphoric acid, fused alkali carbonate, stabilized zirconium oxide, and solid polymers, e.g., a solid polymer ion exchange membrane.

An example of a solid polymer ion exchange membrane is a Proton Exchange Membrane (hereinafter "PEM") which is used in fuel cells to convert the chemical energy of hydrogen and oxygen directly into electrical energy. A PEM is a solid polymer electrolyte which when used in a PEM-type fuel cell permits the passage of protons (i.e., $H^+$ ions) from the anode side of a fuel cell to the cathode side of the fuel cell while preventing passage of reactant fluids such as hydrogen and oxygen gases.

Typically, a PEM-type fuel cell includes an electrode assembly disposed between two fluid flow plates. The electrode assembly usually includes five components: two gas diffusion layers; two catalysts; and an electrolyte. The electrolyte is located in the middle of the five-component electrode assembly. On one side of the electrolyte (the anode side), a gas diffusion layer (the anode gas diffusion layer) is disposed adjacent the anode layer, and a catalyst (the anode catalyst) is disposed between the anode gas diffusion layer and the electrolyte. On the other side of the electrolyte (the cathode side), a gas diffusion layer (the cathode gas diffusion layer) is disposed adjacent the cathode layer, and a catalyst (the cathode catalyst) is disposed between the cathode gas diffusion layer and the electrolyte.

Several PEM-type fuel cells usually are arranged as a multi-cell assembly or "stack." In a multi-cell stack, multiple single PEM-type cells are connected together in series. The number and arrangement of single cells within a multi-cell assembly are adjusted to increase the overall power output of the fuel cell. Typically, the cells are connected in series with one side of an fluid flow plate acting as the anode for one cell and the other side of the fluid flow plate acting as the cathode for an adjacent cell.

Fluid flow plates also have holes therethrough for alignment and for formation of fluid manifolds that service fluids for the stack. Some of the fluid manifolds distribute fuel (such as hydrogen) and oxidant (such as air or oxygen) to, and remove unused fuel and oxidant as well as product water from, the fluid flow fields of the plates. Additionally, other fluid manifolds circulate coolant. Furthermore, other cooling mechanisms such as cooling plates are commonly installed within the stack between adjacent single cells to remove heat generated during fuel cell operation.

Typically, the PEM works more effectively if it is wet. Conversely, once any area of the PEM dries out, the electrochemical reaction in that area stops. Eventually, the dryness can progressively march across the PEM until the fuel cell fails completely. As a result, the fuel and oxidant fed to each fuel cell are usually humidified, e.g., with steam.

SUMMARY OF THE INVENTION

In general, in one aspect, the invention is a fluid flow element for a fuel cell. The fluid flow element includes a plate made at least in part of a conductive material. The plate has a front surface in which there is formed a first plurality of open-faced channels and a second plurality of open-faced channels. The second plurality of channels is interleaved among the first plurality of channels. Each of the channels of said first plurality of channels has an inlet end and an outlet end and each of the channels of the second plurality of channels has an inlet end. The plate further includes a first supply opening, a first exhaust opening, and a second supply opening which is separate from the first supply opening. The inlet ends of the first plurality of channels are connected to the first supply opening and the inlet ends of the second plurality of channels are connected to the second supply opening.

In another aspect, a fuel cell plate has reactant channels, lands, and hydration channels formed in at least a portion of the lands.

In another aspect, a solid polymer fuel cell includes a solid polymer electrolyte, an anode fluid flow plate, and a cathode fluid flow plate. At least one of the plates has a front surface in which there is formed a first plurality of open-faced channels and a second plurality of open-faced channels interleaved among the first plurality of channels. Each of the channels of the first plurality of channels has an inlet end and an outlet end and each of the channels of the second plurality of channels have an inlet end. Each plate further includes a first supply opening, a first exhaust opening, and a second supply opening which is separate from the first supply opening. The inlet ends of the first plurality of channels are connected to the first supply opening and the inlet ends of the second plurality of channels are connected to the second supply opening.

In other embodiments, the second supply opening receives water for humidifying the PEM. Each channel of the second plurality of channels further includes an outlet end connected to a second exhaust opening of the plate. The fluid flow element also can include microchannels which connect the first plurality of channels to the second plurality of channels.

The plurality of first and second channels also can include single or multiple channels formed in serpentine patterns or non-serpentine patterns, such as by forming straight channels. The second plurality of channels may traverse only part of the serpentine pattern formed by the first plurality of channels.

Additionally, in the solid polymer fuel cell, both the anode plate and cathode plate can include a first plurality of open-faced channels and a second plurality of open-faced channels.

The invention has various advantages among one or more of the following. The fluid flow plates which include the coolant distribution channels increase the evenness of hydration water distribution within the PEM active area by physically supplying water or water vapor over the entire PEM active area. The fluid flow plates also provide more uniform cooling of the fluid flow field which results in a more uniform temperature distribution in the stack. Additionally, the fluid flow plate decreases the fuel assembly cooling load by providing hydration water which will provide evaporative cooling. Also, the plate provides higher stack performance by reducing the volume of liquid water that appears in and which tends to cause flooding in the channels carrying fuel or oxidant and waste products.

As used herein the term "PEM active area" refers to the area of the MEA adjacent to the gas diffusion layers.

Other features and advantages of the invention will be apparent from the following detailed description, and from the claims.

DETAILED DESCRIPTION

Figure 1:
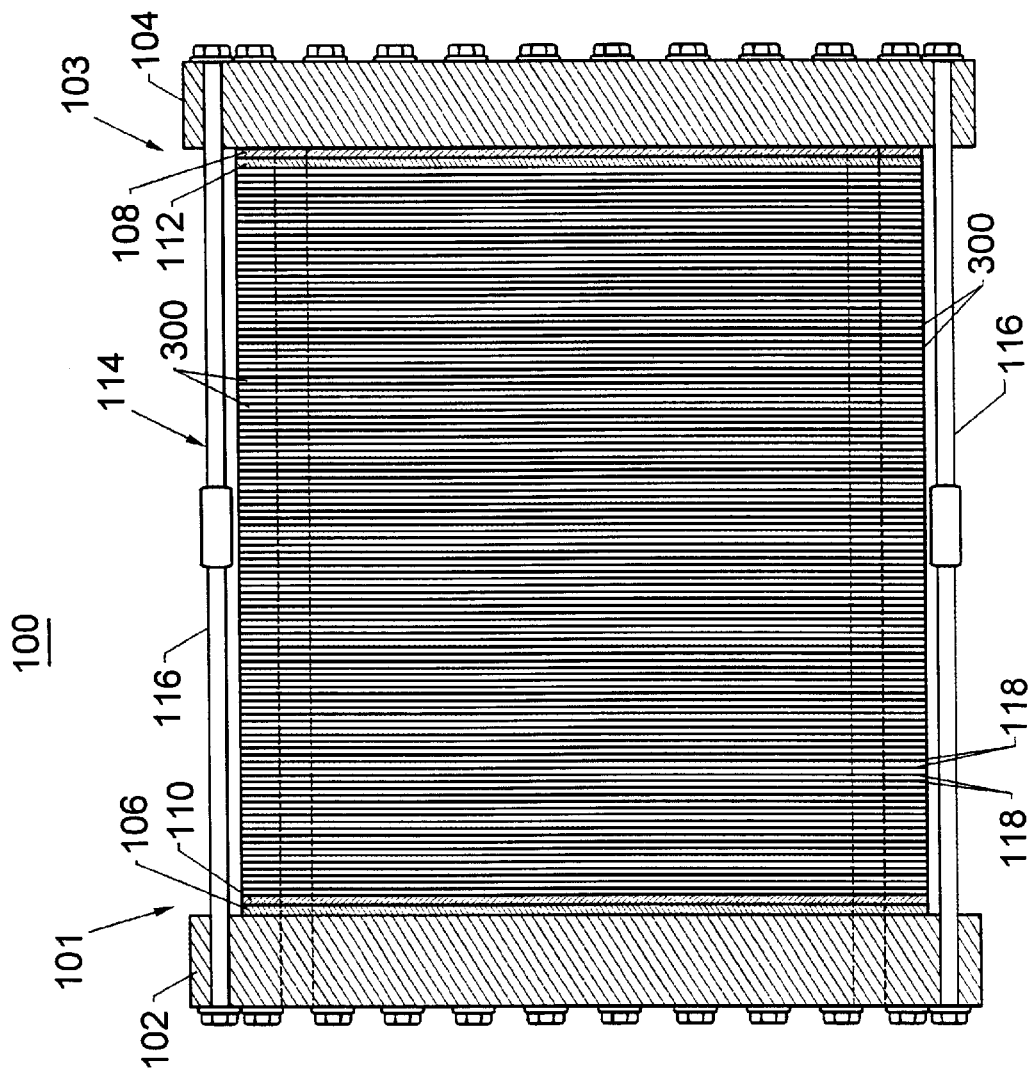
FIG. 1 is a sectional, elevated, side view of a fuel cell assembly.

FIG. 1 shows a fuel cell assembly 100 including a fuel cell stack 114 located between end assembly 101 and end assembly 103. End assembly 101 includes an insulation layer 106 sandwiched between an end plate 102 and a current collector/conductor plate 110. End assembly 103 includes an insulation layer 108 sandwiched between an end plate 104 and a current collector/conductor plate 112. A number of structural members 116, such as tie-bolt(s), join the end plates and are used to compress the fuel cell assembly. Typically, fuel cell assembly 100 is compressed with enough pressure to create both gas tight seals and good electrical contact within the cell stack assembly 114. For example, the compression pressure applied to layers of fuel cell assembly 100 can be anywhere between fifty to one thousand pounds per square inch depending on the design of the cell.

Fuel cell stack 114 includes a number of layers 118 which are assembled together to form several individual PEM-type fuel cells 300. Layers 118 include, for example, fluid flow plates, cooling plates, and solid electrolytes such as PEMs.

Figure 2:
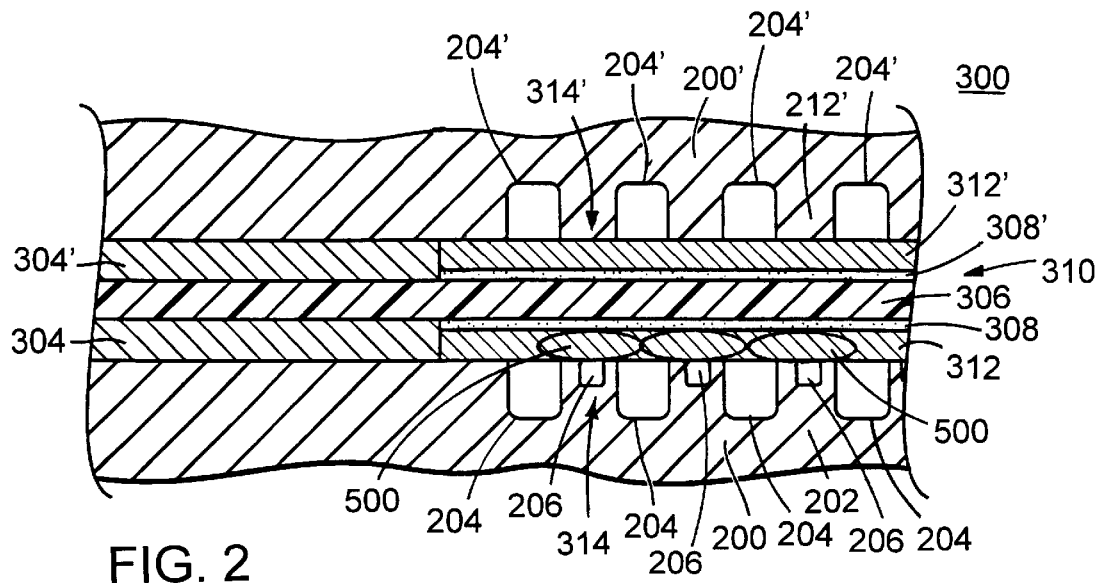
FIG. 2 is a cross-sectional view of a single PEM-type fuel cell of the fuel cell assembly of FIG. 1.

As shown in FIG. 2, PEM-type fuel cell 300 includes an anode gas diffusion layer 312, a membrane electrode assembly 310 (hereinafter "MEA") and a cathode gas diffusion layer 312'(hereafter "GDLs") sandwiched between an anode fluid flow plate 200 and a cathode fluid flow plate 200'. MEA 310 includes a membrane or solid electrolyte 306, and an anode catalyst 308 and a cathode catalyst 308'.

Figure 3:
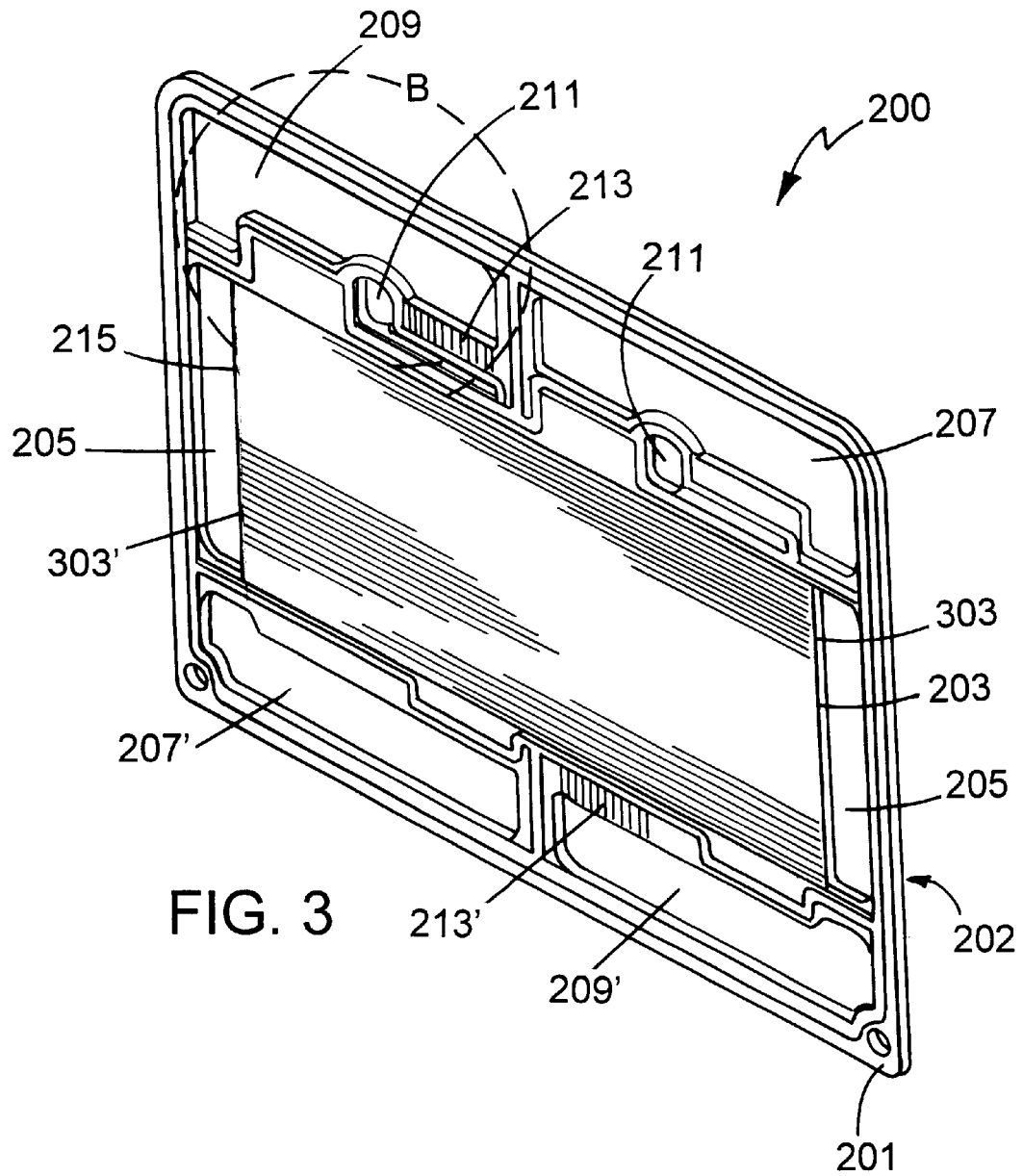
FIG. 3 is an off-axis side view of a fluid flow plate.

A detailed view of anode fluid flow plate 200 is shown in FIG. 3. Anode fluid flow plate 200 includes a back face 201, a front face 202, and holes 205, 207, 207', 209, 209', and 211. Typically, each layer 118 (See FIG. 1) within fuel cell stack 114 includes holes which are identical to the holes of anode fluid flow plate 200. Layers 118 are assembled into the fuel cell stack 114 such that the identical holes for each layer form fluid manifolds which extend along the length of the fuel cell stack 114. The fuel cell fluid manifolds supply fluids to and remove fluids from the fuel cell stack 114. A cooling manifold, for example, is formed by identical holes 205 of each layer 118. The cooling manifold supplies water through holes 205 into an inlet end portion 303 of a series of parallel channels 203 on back face 201. Anode fluid flow plate is cooled as water flows through the parallel channels 203 towards an outlet end portion 303'. Similarly, a humidifying manifold formed by holes 211 supplies deionized water for humidifying the PEM; holes 209 form a fuel manifold for supplying fuel to the anode side of the PEM-type fuel cell; holes 209' form a waste manifold for removing unused fuel from the anode side of the PEM-type fuel cell; holes 207 form an oxidant manifold for supplying oxidant to the cathode side of the PEM-type fuel cell; and holes 207' form a waste manifold for removing oxidant and product water from the cathode side of the PEM-type fuel cell.

Figure 4:
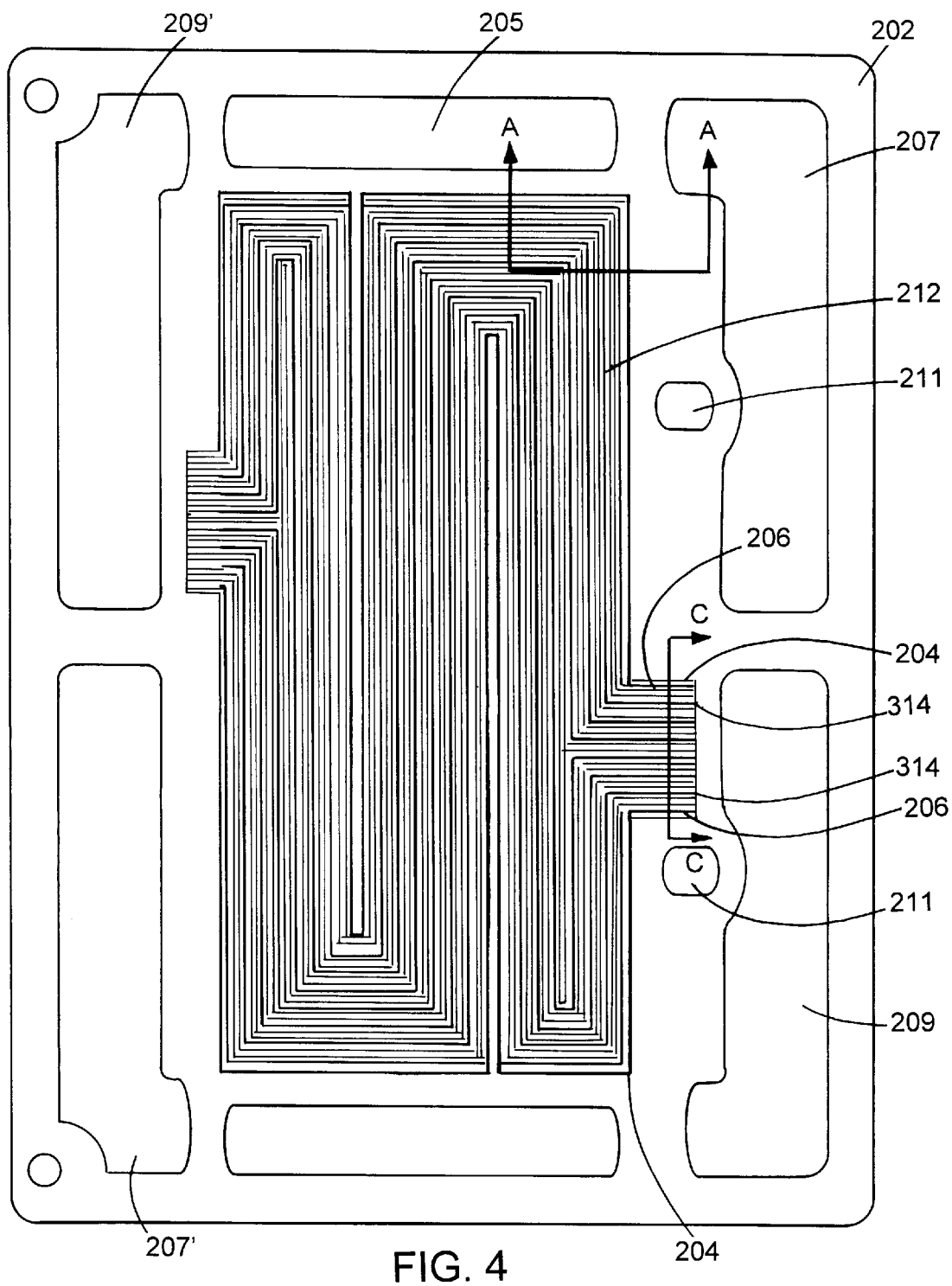
FIG. 4 is a top view of the top face of the fluid flow plate of FIG. 3.
Figure 5:
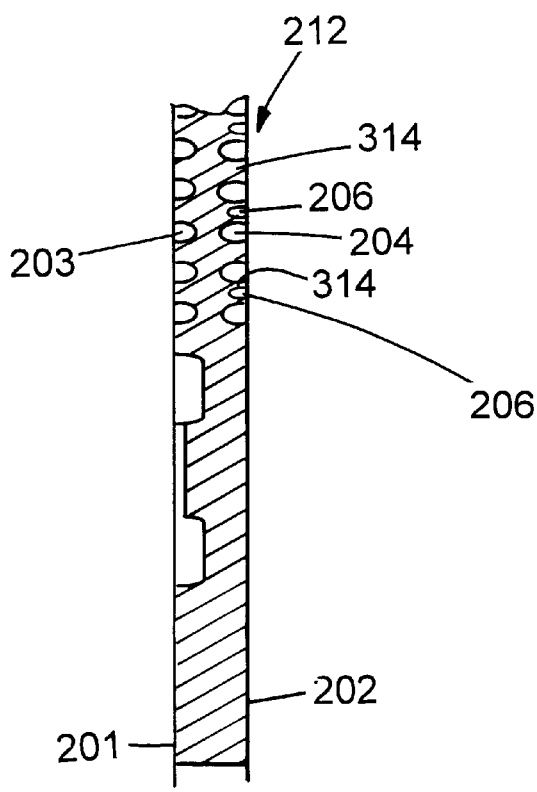
FIG. 5 is a cross-sectional view about section A—A of the fluid flow plate of FIG. 5.
Figure 7:
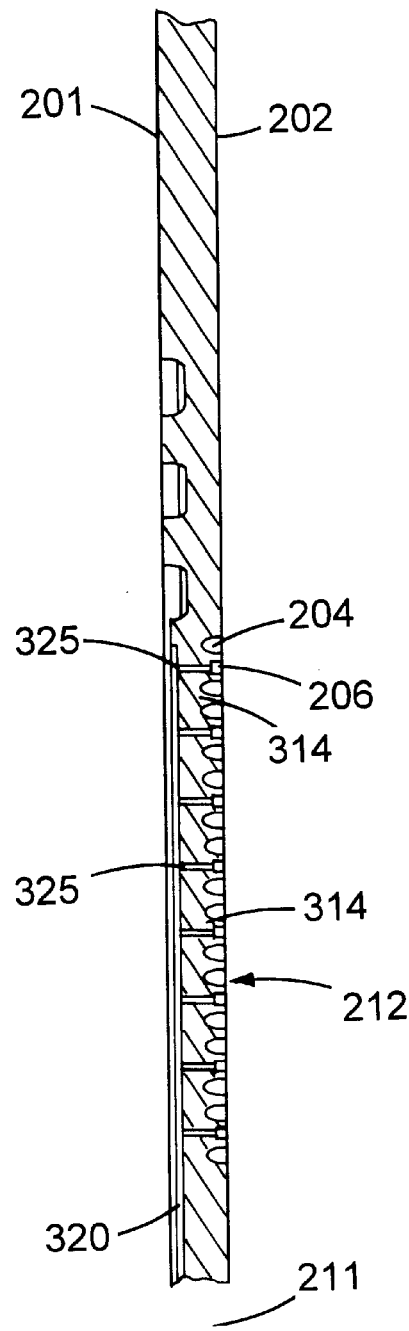
FIG. 7 is a cross-sectional view about section C—C of the fluid flow plate of FIG. 5.
Figure 7:
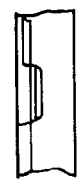
Figure 6:
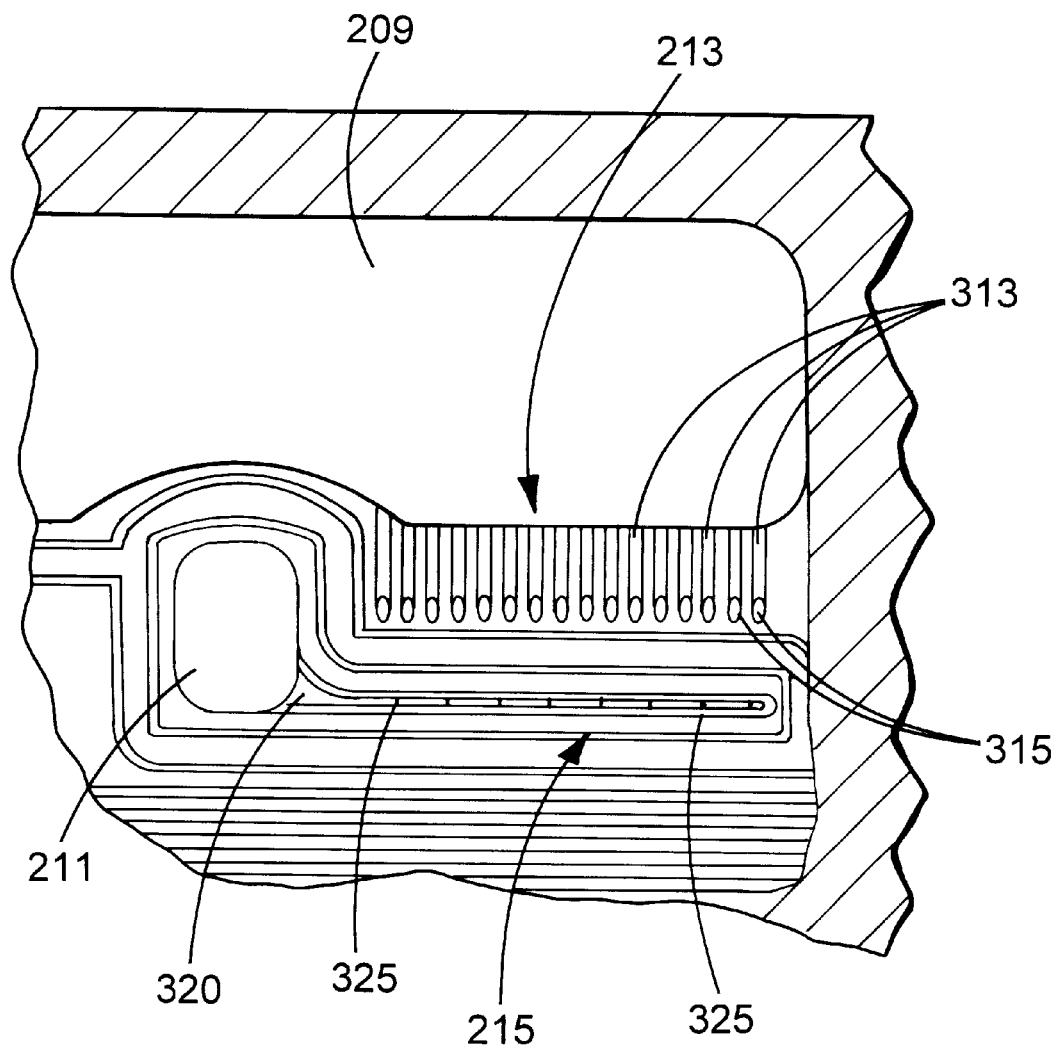
FIG. 6 is an expanded view of section B of the fluid flow plate of FIG. 3.

Referring now to FIG. 4, anode fluid flow plate 200 has a fluid flow face 212 including many flow channel(s) 204 for supplying fuel to the PEM-type cell. For example, fluid flow face 212 includes 16 channels 204 which traverse fluid flow face 212 in a serpentine pattern. Each channel 204 is formed by lands 314 which serve as electrical contact positions on anode face 202. Additionally, in an expanded cross-sectional view as shown in FIG. 5, fluid flow face 212 includes several humidifying channels 206 for supplying water to humidify the PEM of the fuel cell. Humidifying channels 206 are formed in lands 314. For example, 8 of the lands between channels 204 contain humidifying channels 206. Channels 204 are connected to an inlet port 213 and an outlet port 213' (See FIG. 3). Humidifying channels 206 are connected to inlet port 215 (See FIG. 3). Inlet ports 213, 215 and outlet port 213' are used to transmit fluids such as fuel or water to and from the channels on front face 212. As shown in FIG. 6, inlet port 213 includes several port channels 313 extending from hole 209 to bore holes 315. Typically, the number of port channels 313 directly corresponds to the number of channels 204 on fluid flow face 202 and each bore hole 315 connects one port channel 313 on back face 201 to one channel 204 on front face 202. Note that outlet port 213', shown in FIG. 3, is similar to inlet port 213. Inlet port 215 includes a recess 320 extending from hole 211 to bore holes 325 and, as shown in FIG. 6, each bore hole 325 of port 215 connects recess 320 to humidifying channels 206 on front face 202.

Bore holes 315 have a diameter equal to the width of channels 204, and bore holes 325 have a diameter equal to the width of humidifying channels 206. Typically, bore holes 315 have a diameter of less than or equal to 0.040 inches, and bore holes 325 have a diameter less than or equal to 0.020 inches. In one embodiment, bore hole 315 may be oblong having a width of about 0.040 inches and a length of 0.060 inches.

Figure 8:
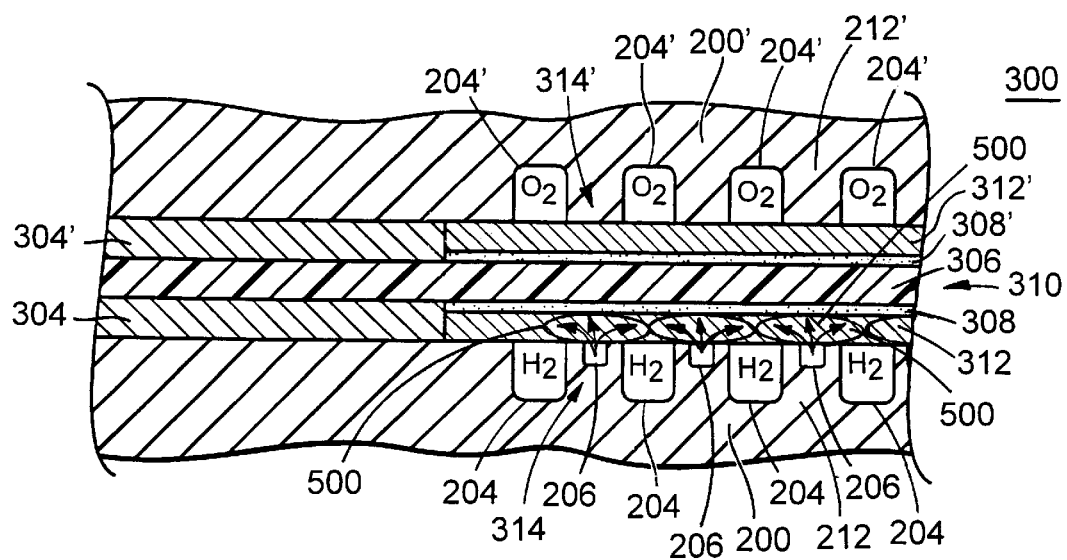
FIG. 8 is the cross-section view of the PEM-type cell of FIG. 2 in operation.

In operation, referring to FIG. 8, PEM-type cell 300 includes fluid flow plates 202, 200' which serve, respectively, as an anode side and as a cathode side of the fuel cell. That is, face 212 is an anode face, and face 212' is a cathode face. Face 212 includes channels 204 formed by lands 314 and receive fuel from the fuel manifold (formed by holes 209) through inlet port 213. Fuel flows along channels 204 and diffuses through GDL 312 into MEA 310 where the fuel is oxidized. Excess fuel flows out of channels 204 through an outlet port and into a waste manifold formed by holes 209'. Humidifying channels 206 are contained within lands 314 and receive deionized water from the humidifying manifold (formed by holes 211) through inlet port 215. Cathode face 212' includes channels 204' formed by lands 314' and receives oxidant from the oxidant manifold (formed by holes 207) through an inlet port. Oxidant flows along channels 204' and diffuses into MEA 310 where the oxidant is reduced. Excess oxidant and product water flow out of channels 204' through an outlet port and into a waste manifold (formed by holes 207'). Optionally, depending upon fuel cell design, cathode lands 314' also include humidifying channels.

Humidifying channels 206 distribute (See Arrows) deionized water through the GDL 312 to humidify both the fuel flowing within channels 206 and membrane 306. Specifically, deionized water within humidifying channels 206 wicks into an area 500 of GDL 312 opposite lands 314 and adjacent channels 204. Once wicked into the GDL, deionized water humidifies the PEM either by wicking directly into the MEA or by humidifying the fuel flowing within channels 204. Typically, the pressure of deionized water in the humidifying channels is adjusted to achieve a desired level of PEM and MEA humidification. For example, when using low flow rates of fuels, the pressure of water is decreased so that the catalysts, GDL, and flow channels are not flooded with deionized water. Alternatively, when using higher flow rates of fuels, the amount of water is increased to compensate for any water that evaporates into the fuel channels. Typically, the amount of deionized water is adjusted to maintain a 100 percent relative humidity of the fuel at 70° C.

Humidifying channels also provide cooling for each PEM-type fuel cell. For example, due to the flow of reactant or oxidant gas, water wicked into the GDL evaporates into and is carried away by the reactant or oxidant gas. As water evaporates, localized cooling may occur resulting in cooling of the PEM-type fuel cell.

The anode GDL 312 and cathode GDL 312' serve as electrochemical conductors between corresponding catalyzed sites of solid polymer electrolyte 306 and the fuel and oxidant flowing in anode channels 204 and cathode channels 204'. GDLs are formed, for example, with a resilient and conductive material such as carbon fabric, carbon fiber paper, carbon cloth, or carbon paper. Additionally, the porous carbon cloth or paper can be infused with TEFLON® to inhibit the collection of water in the GDL.

The GDLs also exhibit a combination of microscopic porosity and macroscopic porosity. Microscopic porosity allows reactant gas molecules to pass generally longitudinally from the flow channels to a surface of the MEA. Macroscopic porosity allows product water formed at the cathode surface of the MEA to be removed by flowing generally longitudinally into the cathode channels 204', to prevent flooding of the catalyst particles.

In the described embodiment, fluid flow plates may be formed of any material, e.g., non-magnetic, austenitic stainless steel, titanium, or compressed carbon. The plate can also include conductive, non-conductive, injection-moldable, and compliant portions. Typically, channels 204 are engraved or milled into a face of an electrically conductive material. Alternatively, the plates can be injection or compression molded. The width, depth, and length of each channel can be varied depending upon the design of the fuel cell. Typically, channels 204 have a width of about 0.040 inches and a depth of about 0.050 inches. Additionally, humidifying channels 206 are engraved or milled into the lands. The width, depth, and length of the humidifying channels are adjusted so that the PEM is adequately humidified. For instance, humidifying channels that are too small won't supply enough humidification to the PEM without using high pressures of water; and humidifying channels that are too big will flood the fuel cell. Typically, humidifying channels 206 have a width of about 0.020 inches and a depth of about 0.025 inches. The cross-sectional profile of the channels can be square, rounded or tapered. When rounded, the bottom of the channel has an effective radius between about 0.020 to 0.005 inches.

As illustrated in FIG. 4, the multiple fluid flow and humidifying channels can be formed in a serpentine pattern on the fluid flow plate. It should be understood, however, that the arrangement of the fluid flow channels and humidifying channels relative both to each other and to the fluid flow plate can be varied based upon the design of the fuel cell. For example, the fluid flow plate may include multiple fluid flow channels and a single humidifying channel both of which form a non-serpentine pattern, such as that formed by straight channels. The channels also may be continuous or discontinuous, such as one channel branching into several channels.

Fluid flow plates may be formed in accordance with the principles of U.S. application Ser. No. 09/054,670 by Carlstrom (entitled "Easily-Formable Fuel Cell Assembly Fluid Flow Plate Having Conductivity and Increased Non-Conductive Material," filed Apr. 3, 1998, and assigned to Plug Power, L.L.C.), which is hereby incorporated herein by reference in its entirety.

Fluid flow plates include bipolar, monopolar, combined monopolar (e.g., anode cooler or cathode cooler), or cooling plates. For instance, when a fluid flow field plate is an anode or a cathode cooler plate, a back face of the plate supplies coolant to the stack and a front face of the plate acts either as an anode or a cathode flow field, supplying reactant gases to the PEM. Alternatively, a bipolar plate includes channels on both a front face and a back face. For example, the front face acts as a cathode for one PEM-type cell and the back face acts as an anode for an adjacent PEM-type cell. In this arrangement channels on the front face conduct oxidant and waste product and the channels on the back face conduct fuel. Additionally, the lands on both sides of the bipolar plate may include humidifying channels.

In the embodiments described above, the solid electrolyte may include a solid polymer electrolyte made with a polymer such as a material manufactured by E. I. DuPont de Nemours Company and sold under the trademark NAFION®. In another example, the solid polymer electrolyte might be formed with a product manufactured by W.L. Gore & Associates (Elkton, Md.) and sold under the trademark GORE-SELECT®. The MEA might be formed with a product manufactured by W.L. Gore & Associates and sold under the trade designation PRIMEA 5510-HS.

In alternative embodiments, the humidifying channels only partially extend into the PEM active area. In this situation, the humidifying channels indirectly humidify the remaining portion of the PEM active area by humidifying the fuel and oxidant gases as they flow past the humidifying channels.

In another alternative embodiment, the lands of the fluid flow field plate include humidifying channels and microchannels which allow deionized water to flow directly from the humidifying channel into the fuel/oxidant flow channels.

It is understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A fuel cell plate comprising reactant channels and lands, wherein at least a portion of the lands have humidification channels formed therein.

2. The fuel cell plate of claim 1, wherein the reactant channels are formed by a single channel.

3. The fuel cell plate of claim 2, wherein the single channel is in a serpentine pattern.

4. The fuel cell plate of claim 1, wherein the reactant channels are formed by multiple channels.

5. The fuel cell plate of claim 4, wherein the multiple channels are in a serpentine pattern.

6. A fluid flow element for a fuel cell, the fluid flow element comprising:
   a plate made at least in part of a conductive material, said plate having a front surface in which there is formed a first plurality of open-faced channels and a second plurality of open-faced channels, said second plurality of channels interleaved among said first plurality of channels, each of the channels of said first plurality of channels having an inlet end and an outlet end and each of the channels of said second plurality of channels having an inlet end, said plate further including a first supply opening, a first exhaust opening, and a second supply opening which is separate from the first supply opening,
   wherein the inlet ends of the first plurality of channels are connected to the first supply opening and the inlet ends of the second plurality of channels are connected to the second supply opening, and the plate further includes microchannels which connect the first plurality of channels to the second plurality of channels.

7. The fluid flow element of claim 6, wherein the plate further includes a second exhaust opening which is separate from the first exhaust opening.

8. The fluid flow element of claim 7, wherein each of the channels of said second plurality of channels further includes an outlet end.

9. The fluid flow element of claim 8, wherein the outlet ends of the first plurality of channels is connected to the first exhaust opening and the outlet ends of the second plurality of channels are connected to the second exhaust opening.

10. The fluid flow element of claim 6, wherein the first plurality of channels is formed in a serpentine pattern.

11. The fluid flow element of claim 6, wherein the second supply opening receives water.

12. A fluid flow element for a fuel cell, the fluid flow element comprising:
   a plate made at least in part of a conductive material, said plate having a front surface in which there is formed a first plurality of open-faced channels and a second plurality of open-faced channels, said second plurality of channels interleaved among said first plurality of channels, each of the channels of said first plurality of channels having an inlet end and an outlet end and each of the channels of said second plurality of channels having an inlet end, said plate further including a first supply opening, a first exhaust opening, and a second supply opening which is separate from the first supply opening,
   wherein the inlet ends of the first plurality of channels are connected to the first supply opening and the inlet ends of the second plurality of channels are connected to the second supply opening, the first plurality of channels is formed in a serpentine pattern, and the second plurality of channels traverses only part of the serpentine pattern of the first plurality of channels.

13. The fluid flow element of claim 12, wherein the plate further includes a second exhaust opening which is separate from the first exhaust opening.

14. The fluid flow element of claim 13, wherein each of the channels of said second plurality of channels further includes an outlet end.

15. The fluid flow element of claim 14, wherein the outlet ends of the first plurality of channels is connected to the first exhaust opening and the outlet ends of the second plurality of channels are connected to the second exhaust opening.

16. The fluid flow element of claim 12, wherein the second supply opening receives water.

17. The fluid flow element of claim 12, wherein the plate further includes microchannels which connect the first plurality of channels to the second plurality of channels.

18. A solid polymer fuel cell comprising:
   a solid polymer electrolyte;
   an anode fluid flow plate; and a cathode fluid flow plate;

wherein at least one of the plates is made in part of a conductive material and said plate having a front surface in which there is formed a first plurality of open-faced channels and a second plurality of open-faced channels, said second plurality of channels interleaved among said first plurality of channels, each of the channels of said first plurality of channels having an inlet end and an outlet end and each of the channels of said second plurality of channels having an inlet end, said plate further including a first supply opening, a first exhaust opening, and a second supply opening which is separate from the first supply opening, wherein the inlet ends of the first plurality of channels are connected to the first supply opening and the inlet ends of the second plurality of channels are connected to the second supply opening, the plate further including microchannels which connect the first plurality of channels to the second plurality of channels.

19. The solid polymer fuel cell of claim 18, wherein the plate further includes a second exhaust opening which is separate from the first exhaust opening.

20. The solid polymer fuel cell of claim 19, wherein each of the channels of said second plurality of channels further includes an outlet end.

21. The solid polymer fuel cell of claim 20, wherein the outlet ends of the first plurality of channels is connected to the first exhaust opening and the outlet ends of the second plurality of channels are connected to the second exhaust opening.

22. The solid polymer fuel cell of claim 18, wherein the first plurality of channels traverse an area of the surface of the plate in a serpentine pattern.

23. The solid polymer fuel cell of claim 18, wherein the second supply opening receives water.

24. The solid polymer fuel cell of claim 18, wherein both the anode plate and cathode plate include a front surface in which there is formed a first plurality of open-faced channels and a second plurality of open-faced channels, said second plurality of channels interleaved among said first plurality of channels, each of the channels of said first plurality of channels having an inlet end and an outlet end and each of the channels of said second plurality of channels having an inlet end, each plate further including a first supply opening, a first exhaust opening, and a second supply opening which is separate from the first supply opening, wherein the inlet ends of the first plurality of channels are connected to the first supply opening and the inlet ends of the second plurality of channels are connected to the second supply opening.

25. The solid polymer fuel cell of claim 24, wherein the second opening of the anode plate and the second opening of the cathode plate receive water.

26. A solid polymer fuel cell comprising:

a solid polymer electrolyte;

an anode fluid flow plate; and a cathode fluid flow plate;

wherein at least one of the plates is made in part of a conductive material and said plate having a front surface in which there is formed a first plurality of open-faced channels and a second plurality of open-faced channels, said second plurality of channels interleaved among said first plurality of channels, each of the channels of said first plurality of channels having an inlet end and an outlet end and each of the channels of said second plurality of channels having an inlet end, said plate further including a first supply opening, a first exhaust opening, and a second supply opening which is separate from the first supply opening, wherein the inlet ends of the first plurality of channels are connected to the first supply opening and the inlet ends of the second plurality of channels are connected to the second supply opening, the first plurality of channels traversing an area of the surface of the plate in a serpentine pattern, and the second plurality of channels traversing only part of the serpentine pattern of the first plurality of channels.

27. The solid polymer fuel cell of claim 26, wherein the plate further includes a second exhaust opening which is separate from the first exhaust opening.

28. The solid polymer fuel cell of claim 27, wherein each of the channels of said second plurality of channels further includes an outlet end.

29. The solid polymer fuel cell of claim 28, wherein the outlet ends of the first plurality of channels is connected to the first exhaust opening and the outlet ends of the second plurality of channels are connected to the second exhaust opening.

30. The solid polymer fuel cell of claim 26, wherein the plate further includes microchannels which connect the first plurality of channels to the second plurality of channels.

31. The solid polymer fuel cell of claim 26, wherein the second supply opening receives water.

32. The solid polymer fuel cell of claim 26, wherein both the anode plate and cathode plate include a front surface in which there is formed a first plurality of open-faced channels and a second plurality of open-faced channels, said second plurality of channels interleaved among said first plurality of channels, each of the channels of said first plurality of channels having an inlet end and an outlet end and each of the channels of said second plurality of channels having an inlet end, each plate further including a first supply opening, a first exhaust opening, and a second supply opening which is separate from the first supply opening, wherein the inlet ends of the first plurality of channels are connected to the first supply opening and the inlet ends of the second plurality of channels are connected to the second supply opening.

33. The solid polymer fuel cell of claim 32, wherein the second opening of the anode plate and the second opening of the cathode plate receive water.

* * * * *